United States Patent [19]

Ishikawa et al.

[11] Patent Number: 4,507,354

[45] Date of Patent: Mar. 26, 1985

[54] ELECTROMAGNETIC WAVE ABSORBERS OF SILICON CARBIDE FIBERS

[75] Inventors: Toshikatsu Ishikawa, Tokyo; Hiroshi Ichikawa, Yokohama; Yoshikazu Imai, Tokyo; Tokuji Hayase, Chigasaki; Yoichi Nagata, Yokohama, all of Japan

[73] Assignee: Nippon Carbon Co., Ltd., Tokyo, Japan

[21] Appl. No.: 477,249

[22] Filed: Mar. 21, 1983

[30] Foreign Application Priority Data

Mar. 31, 1982 [JP] Japan ................................ 57-51034

[51] Int. Cl.[3] ................................................ B32B 7/00

[52] U.S. Cl. .................................... 428/245; 428/246; 428/285; 428/286; 428/294; 428/367; 428/457; 428/688; 428/698; 428/902

[58] Field of Search ............... 428/245, 246, 285, 286, 428/294, 367, 457, 688, 698, 902

[56] References Cited

U.S. PATENT DOCUMENTS 4,324,843 4/1982 Brennan ............................ 428/367

*Primary Examiner*—Marion E. McCamish

*Attorney, Agent, or Firm*—Bucknam and Archer

[57] ABSTRACT

An electromagnetic wave absorber comprising an electromagnetic wave absorbing layer consisting essentially of silicon carbide fibers, which layer may be applied to a metal plate. The wave absorber comprising the absorbing layer-applied metal plate exerts wave absorption expressed in terms of a wave attenuation which is at least 10 dB higher than the inherent attenuation caused by reflection of the wave by the absorbing layer-free original metal plate, the wave used being one which has a frequency of 8-16 GHz. Further, the silicon carbide fibers may be made into woven cloths, mat felts or the like which are laminated together and then composited with a synthetic resin or ceramics to prepare the wave absorbing layer.

5 Claims, 2 Drawing Figures

ELECTROMAGNETIC WAVE ABSORBERS OF SILICON CARBIDE FIBERS

This invention relates to electromagnetic wave absorbers and more particularly it relates to wave absorbers wherein a wave absorbing layer made of silicon carbide fibers is used thereby to render the absorbers excellent in strength, heat resistance and chemical resistance and satisfactory in broad-band wave absorbability.

The wave absorbers which have heretofore been proposed include (1) composites of a ferrite and an organic material such as a resin or rubber, (2) composites of carbon powder and an organic material such as resin fibers or a resin and (3) laminates of carbon fibers. However, since not only composites of a ferrite and an organic material will exhibit low absorbability when used to absorb waves of high frequency, particularly at least 10 GHz, but also they have a high specific gravity, it has been difficult to produce light-weight wave absorbers therefrom. It has also been difficult to produce large-sized wave absorbers from composites of carbon powder and an organic material since the composites have low strength. The laminates of carbon fibers are disadvantageous in their great thickness and low strength from the view-point of wave absorbability. Further, it is impossible to overcome these drawbacks to a large extent even by the combined use of materials for the above conventional wave absorbers.

Thus, there have not been obtained yet any wave absorbers which are excellent in strength and the like as well as in wave absorbability in high frequency bands.

The primary object of this invention is to provide wave absorbers which are excellent not only in properties such as strength, heat resistance and chemical resistance but also in wave absorbability particularly in high frequency bands.

This object may be achieved by using silicon carbide fibers in the wave absorbing layer of wave absorbers to be obtained.

Thus, the wave absorbers contemplated by this invention are those characterized by containing a wave absorbing layer made of silicon carbide fibers.

Figure 1:
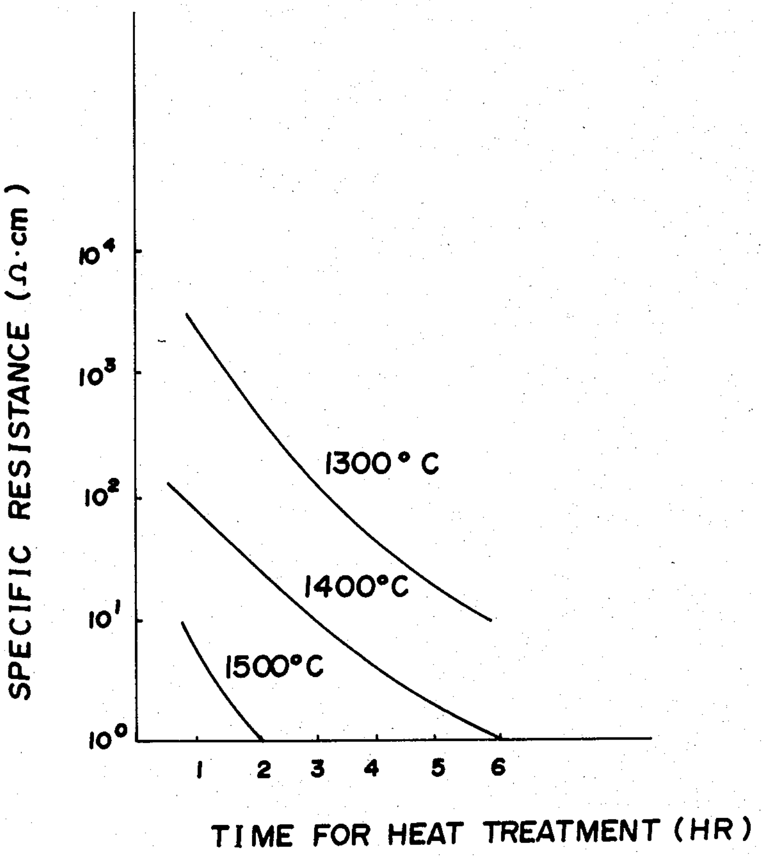
Figure 2:
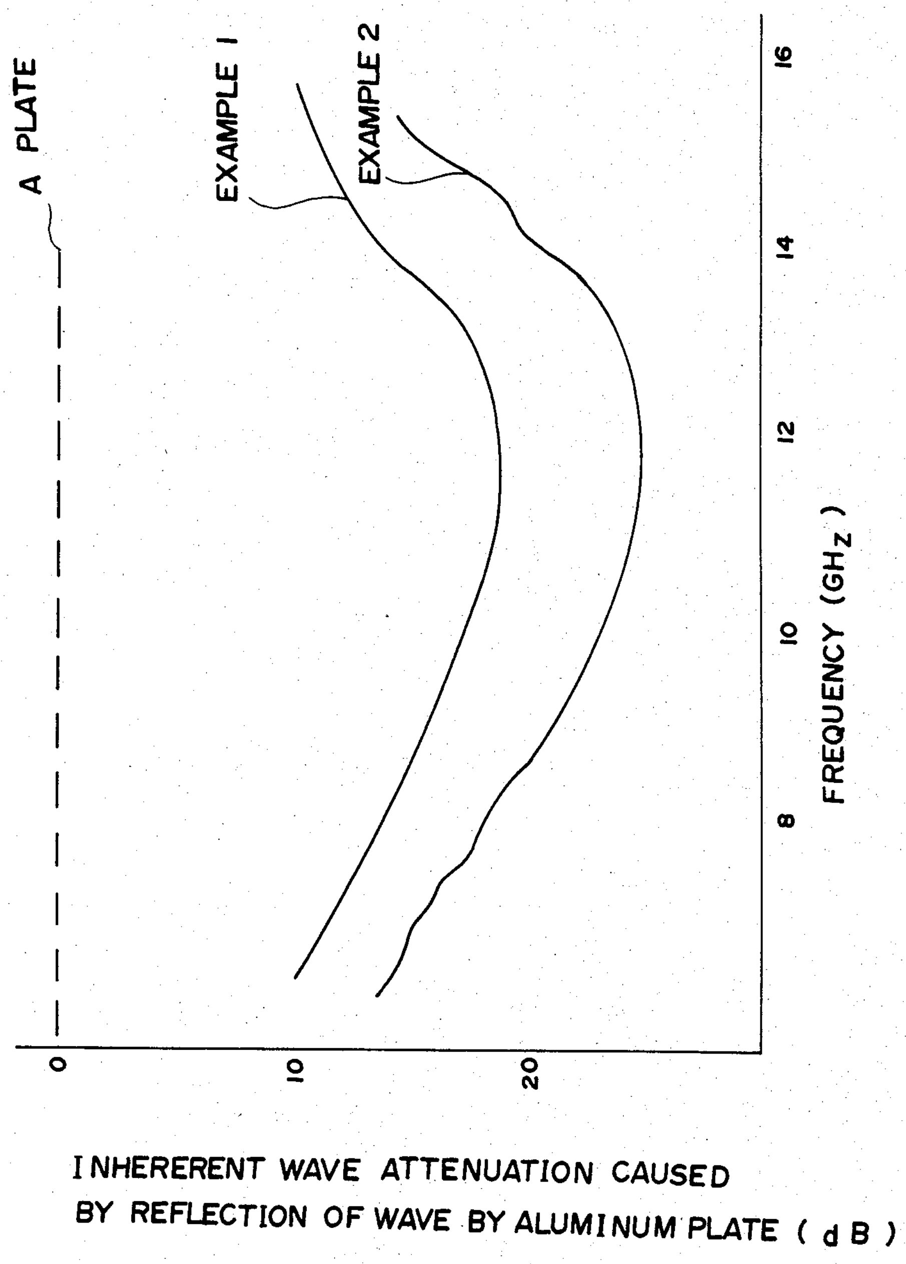

FIG. 1 is a graph showing the relationship between the specific resistance of silicon carbide fibers and the time for the heat treatment thereof, at each of 1300° C., 1400° C. and 1500° C. and FIG. 2 is graphs respectively showing the wave attenuations effected by the wave absorbers and determined on the basis of the inherent wave attenuation caused by reflection of the wave by the original aluminum plate in the following Examples 1 and 2.

The silicon carbide fibers used in this invention have a specific electrical resistance of preferably $10^0$–$10^5\Omega\cdot$cm, more preferably $10^1$–$10^3\Omega\cdot$cm. Such specific electrical resistances may be adjusted by varying heat treating conditions in an inert atmosphere as indicated in FIG. 1. The silicon carbide fibers may be made into woven cloths, mats or felts for use in this invention, or they may be arranged parallel to one another in plural layers, laminated and then composited with a synthetic resin or ceramics to form a composite for use as a wave absorbing layer in this invention. The aforesaid woven cloths, mats, felts or laminates made of silicon carbide fibers may by composited with a synthetic resin or ceramics by bonding them to the surface of the resin or ceramics or sandwiching them in between the resin or ceramics. The higher the specific strength (strength/specific gravity) of composites of the silicon carbide fibers and resin or ceramics is, the more desirable the composites are. The synthetic resins used in the preparation of such composites include thermosetting resins such as epoxy type and phenol type resins, and thermoplastic resins such as PPS and nylon. The ceramics used herein include alumina-silica, SiN, SiC and Sialon.

The wave absorbers of this invention are required to have wave absorbability expressed in terms of a wave attenuation which is at least 10 dB (1/10 of the amount of incidence) higher than the wave attenuation caused by reflection of the wave by the absorbing layer-free original metal plate, the wave used being one which has a frequency of 8–16 GHz (the latter wave attenuation obtained with the absorbing layer-free original metal plate being hereinafter referred to as "the inherent attenuation" for brevity). The wave absorbers of this invention are effective particularly when used for military planes since waves having a frequency of 8–16 GHz are used in radars. In addition, there have been none of the conventional wave absorbers which will exhibit wave absorption expressed in terms of a wave attenuation higher than the inherent wave attenuation by at least 10 dB, the wave used having a frequency of 8–16 GHz.

As is seen from the above, not only the wave absorbers of this invention will exhibit a satisfactory wave absorbability which is at least 10 dB (over a wide-band frequency of 8–16 GHz) higher than that obtained with the conventional wave absorbers, but also the silicon carbide fibers used in the wave absorption layer in said wave absorbers exhibit a tensile strength of as high as at least 120 Kg/mm$^2$ in a case where they are used alone in the absorbing layer exhibit a tensile strength of as high as at least 70 Kg/mm$^2$ even in a case where they are composited with a synthetic resin or ceramics. Further, the wave absorbers using silicon carbide fibers alone in their absorbing layer may be regularly used at 1000° C. in an oxidizing atmosphere and are corrosion resistant to almost all of chemicals; thus, they are excellent in heat resistance and chemical resistance. It is also possible that the silicon carbide fibers are composited with a synthetic resin or ceramics and then molded to obtain composites in various forms.

This invention will be better understood by the examples and comparative examples.

EXAMPLE 1

An organosilicon polymer having a molecular weight of 2000-20000 was melt spun, made infusible and then fired to obtain silicon carbide fibers which were treated to obtain a textile fabric made of 0.5 mm thick 8-layer satin. The textile fabric so obtained was heat treated at 1300° C. for 6 hours in an argon atmosphere to obtain a textile fabric made of silicon carbide fibers having an electrical resistance of $2\times10^2\Omega\cdot$cm. The thus obtained textile fabric made of silicon carbide fibers which was used as an electromagnetic wave absorber, was applied to the front side of a metallic aluminum plate. The textile fabric-applied aluminum plate was measured for attenuation of a wave having a frequency of 8–16 GHz by reflection thereof by said textile fabric-applied plate on the basis of the inherent attenuation (caused by reflection of the wave by the fabric-free original aluminum plate). The result is as shown in FIG. 2. It is seen from FIG. 2 that the wave absorber of this invention attained an attenuation which was at least 10 dB higher than the inherent attenuation and that said absorber had excellent wave absorbability.

EXAMPLE 2

The same organosilicon polymer as used in Example 1 was melt spun, made infusible and then heat treated at 1400° C. for 10 minutes in an inert atmosphere to obtain silicon carbide fibers having an electrical specific resistance of $3\times10^{2}\Omega\cdot cm$ and a tensile strength of 120 $Kg/mm^2$. The silicon carbide fibers so obtained were composited with an epoxy resin as the matrix material to obtain an unidirectionally reinforced fiber-resin composite (FRP) which was used as an electromagnetic wave absorber, in the plate form, having a fiber voluminal ratio ($V_f$) of 60 vol.%. The thus obtained composite in the plate form was applied to the front side of a metallic aluminum plate with an epoxy resin binder to obtain a test sample which was measured for attenuation (dB) of an 8–16 GHz frequency wave on the basis of the inherent attenuation thereof. The result is as shown in FIG. 2. As is seen from FIG. 2, the use of said composite, that is a wave absorber attained an attenuation which was a least 10 dB higher than the inherent attenuation, thereby to prove that this absorber had excellent wave absorbability. In addition, the FRP plate had a tensile strength of 75 $Kg/mm^2$ in the direction of the fibers, this indicating sufficient specific strength.

EXAMPLE 3

The same organosilicon polymer as used in Example 1 was melt spun, made infusible and then heat treated at 1300° C. for 20 minutes in an inert atmosphere to obtain silicon carbide fibers having an electrical specific resistance of $3\times10^{3}\Omega\cdot cm$ and a tensile strength of 150 $Kg/mm^2$.

The silicon carbide fibers so obtained were passed through an acryl resin with finely powdered $Si_3N_4$ (350 mesh or finer) dispersed therein to sufficiently impregnate the $Si_3N_4$ fine powder into between the fibers thereby preparing prepreg sheets.

Ten of the thus prepared prepreg sheets were laminated together and introduced into a vacuum container which was then degassed, reduced in pressure and enclosed.

The thus enclosed container with the prepreg sheets held therein was heat treated at 1400° C. and 100 atm. for one hour by the use of a hot hydrostatic press, to obtain an unidirectionally SiC fiber-reinforced $Si_3N_4$ composite (FRC) having a fiber voluminal ratio ($V_f$) of 50 vol.%.

The FRC so obtained which was used as an electromagnetic wave absorber was applied to a steel plate at its front surface. The thus FRC-applied steel plate was measured for attenuation (dB) of an 8–16 GHz frequency wave on the basis of the inherent attenuation thereof with the result that the FRC-applied steel plate exhibited an attenuation higher than the inherent attenuation by at least 20 dB when a 13 GHz frequency wave impinged on the FRC-applied steel and also exhibited at attenuation higher than the inherent attenuation by at least 12 dB when a wave having a frequency of 8–16 GHz except for 13 GHz impinged thereon.

In addition, the said FRC had a flexural strength of 70 $Kg/mm^2$ which was superior to 50 $Kg/mm^2$ for usual $Si_3N_4$, and it is more excellent in heat resistance than the FRP produced in Example 2 since the former was a FRC.

COMPARATIVE EXAMPLE 1

The same organisilicon polymer as used in Example 1 was melt spun, made infusible and then heat treated at 1200° C. for 10 minutes in an inert atmosphere to obtain silicon carbide fibers having an electrical specific resistance of $2\times10^{6}\Omega\cdot cm$. The fibers so obtained were composited with an epoxy resin as the matrix to obtain an unidirectionally reinforced fiber-resin composite (FRP), in the plate form, having a fiber voluminal ratio ($V_f$) of 60 vol.%. The composite so obtained in the plate form was applied to a metallic aluminum at its front side with an epoxy resin binder. The thus obtained FRP-applied aluminum plate was measured for attenuation (dB) on the basis of the inherent attenuation, using a wave having a frequency of 8–16 GHz as the wave to be reflected by the FRP-applied or FRP-free aluminum plate, with the result that the attenuation obtained was in the range of only 0–5 dB on the basis of the inherent attenuation.

COMPARATIVE EXAMPLE 2

The same organosilicon polymer as used in Example 1 was melt spun, made infusible and then heat treated at 1500° C. for 180 minutes in an inert atmosphere to obtain silicon carbide fibers having an electrical specific resistance of $3\times10^{-1}\Omega\cdot cm$. The procedure of Comparative Example 1 was then followed except that the above silicon carbide fibers were used, thereby to obtain a FRP-applied aluminum plate which was then measured for wave attenuation (dB) on the basis of the inherent wave attenuation caused by reflection of the wave by the original aluminum plate, the wave used being one having a frequency of 8–16 GHz, with the result that the attenuation measured was only 0–3 dB.

As mentioned above, the electromagnetic wave absorbers of this invention have satisfactory wave absorbability, are excellent in strength, heat resistance and chemical resistance and may be composited with a synthetic resin or ceramics to obtain composites of any desired form; therefore, they are particularly useful as those for military airplanes.

What is claimed is:

1. The composite of a metal plate which is aluminum or steel and an electromagnetic wave absorber which comprises said metal plate and an electromagnetic wave absorbing layer consisting essentially of silicon carbide fibers having a specific electrical resistance of $10^{\circ}$–$15^{5}\Omega\cdot cm$.

2. The composite according to claim 1, wherein the electromagnetic wave absorbing layer is prepared by laminating together at least one member selected from the group consisting of woven cloths made of said silicon carbide fibers, mat felts made thereof and bundles made of said silicon carbide fibers arranged parallel to one another to form laminates and then composing the thus formed laminates with a member selected from the group consisting of synthetic resins and ceramics.

3. The composite according to claim 1 wherein said composite exerts an attenuation which is at least 10 dB higher than the inherent attenuation caused by reflection of the wave by absorbing layer-free original metal plate, the wave used having a frequency of 8–16 GHz.

4. The composite according to claim 1 wherein said electromagnetic wave absorber is a composite of (a) an electromagnetic wave absorbing layer consisting essentially of silicon carbide fibers having electrical specific resistance of $10^{\circ}$–$15^{5}$Ω·cm and (b) an acrylic resin reinforced with $Si_3N_4$.

5. The method of absorbing electromagnetic waves and attenuating the wave reflection caused by a metal plate which is aluminum or steel, by at least 10 dB higher than the attenuation caused by reflection of said metal plate, an electromagnetic wave absorber consisting of silicon carbide fibers having a specific electrical resistance of $10^{\circ}$–$10^{5}$Ω·cm.

* * * * *